(12) United States Patent
Narita et al.

(10) Patent No.: US 7,502,074 B2
(45) Date of Patent: Mar. 10, 2009

(54) TELEVISION SIGNAL RECEIVER AND MOBILE PHONE EQUIPPED WITH THE SAME

(75) Inventors: Shusuke Narita, Daito (JP); Toshihiro Takagi, Daito (JP); Tatsuo Miyagawa, Daito (JP); Yasuhiro Inui, Daito (JP); Takahiro Katayama, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 540 days.

(21) Appl. No.: 11/176,378

(22) Filed: Jul. 8, 2005

(65) Prior Publication Data

US 2006/0009258 A1    Jan. 12, 2006

(30) Foreign Application Priority Data

Jul. 8, 2004    (JP) .............................. 2004-201696

(51) Int. Cl.
*H04N 5/44*    (2006.01)

(52) U.S. Cl. ....................................... 348/559; 348/725

(58) Field of Classification Search ................ 348/559, 348/560, 460–462, 467–468, 552, 553
See application file for complete search history.

(56) References Cited

U.S. PATENT DOCUMENTS

| 5,890,071 | A  | * | 3/1999  | Shimanuki ............... 455/567 |
| 6,452,640 | B1 | * | 9/2002  | Yuen et al. ............... 348/460 |
| 6,459,906 | B1 | * | 10/2002 | Yang ........................ 455/556.1 |
| 7,200,853 | B2 | * | 4/2007  | Kawai ........................ 725/34 |
| 2003/0154482 | A1 | * | 8/2003 | Tsukamoto et al. ........... 725/53 |
| 2005/0075069 | A1 | * | 4/2005 | Higuchi ..................... 455/3.05 |
| 2005/0143139 | A1 | * | 6/2005 | Park et al. .................. 455/567 |

FOREIGN PATENT DOCUMENTS

| JP | 62-98873 A  | 5/1987 |
| JP | 5-37893 A   | 2/1993 |
| JP | 07-177404   | 7/1995 |
| JP | 2001-69389 A | 3/2001 |
| JP | 2003-259289 | 9/2003 |

OTHER PUBLICATIONS

Japanese Office Action dated Dec. 24, 2008 w/English translation (six (6) pages).

* cited by examiner

*Primary Examiner*—Paulos M Natnael
(74) *Attorney, Agent, or Firm*—Crowell & Moring LLP

(57) ABSTRACT

A television signal receiver comprises a tuner, a decoder, a first storage medium that stores a frame of video signals extracted by the decoder as a captured image, a second storage medium that stores sound data representing a variety of shutter sounds to be generated for informing a user that a captured image has been stored in the first storage medium, and a sound generating circuit that, when a captured image is stored in the first storage medium, selects a shutter sound among the variety of shutter sounds represented by the sound data stored in the second storage medium and generates the selected shutter sound. Since the television signal receiver is configured to generate a shutter sound when a captured image is stored in the first storage medium, it can inform a user about storage of a captured image in the first storage medium without causing video images of a television program to be partly hidden from view. Further, since the television signal receiver is capable of generating the variety of shutter sounds, it can provide a user with various kinds of information by varying the shutter sound to be generated.

8 Claims, 5 Drawing Sheets

TELEVISION SIGNAL RECEIVER AND MOBILE PHONE EQUIPPED WITH THE SAME

BACKGROUND OF THE INVENTION

1. Field of the Invention

The present invention relates to a television signal receiver having a still image capture function and a mobile phone equipped with the television signal receiver.

2. Description of the Related Art

A still image capture function is the function of storing one frame of moving images displayed on a monitor as a still image (hereinafter referred to as a captured image) in a storage medium when a capture button is depressed by a user. This function is known in the art as well as a television signal receiver having the function.

The television signal receiver having the above function typically informs a user that an image capture has been performed by its on-screen display (OSD) function, for example, at the time when a captured image has been stored in a storage medium in response to depression of a capture button by a user. Consequently, video images of a television program may be partly hidden behind the information displayed by the OSD function, so that a user may be hindered from viewing the television program.

The conventional television signal receiver has another problem. The television signal receiver informs a user, by the OSD function, that an image capture has been performed, but it does not provide a user with any additional information related to the image capture, e.g., information about the format of stored video signals.

An imaging device is known that provides a user with additional information in storing a still image. It is designed to inform a user about the amount of storage available on a storage medium for storing still images (see, for example, Japanese laid-open patent publication 2003-259289).

Further, a digital camera is known that comprises a device for generating a shutter sound to inform a user that a still image has been stored without the use of image display (see, for example, Japanese laid-open patent publication Hei 7-177404).

However, even if the technologies disclosed in Japanese laid-open patent publication 2003-259289 and Japanese laid-open patent publication Hei 7-177404 are applied to the conventional television signal receiver, the above-described problems cannot be solved. More particularly, even with the application of the technologies, the conventional television signal receiver is incapable of informing a user that a captured image has been stored without hindering the user from viewing a television program as well as of providing a user with additional information related to an image capture.

SUMMARY OF THE INVENTION

An object of the present invention is to provide a television signal receiver and a mobile phone equipped with the television signal receiver that are capable of informing a user that a captured image has been stored without hindering the user from viewing a television program as well as of providing a user with additional information associated with an image capture.

According to a first aspect of the present invention, a television signal receiver comprises: a tuner that receives television signals; a decoder that extracts video signals from the television signals received by the tuner; a first storage medium that stores a frame of video signals extracted by the decoder as a captured image; a second storage medium that stores sound data representing a variety of shutter sounds to be generated for informing a user that a captured image has been stored in the first storage medium; and a sound generating circuit that, when a captured image is stored in the first storage medium, selects a shutter sound among the variety of shutter sounds represented by the sound data stored in the second storage medium and generates the selected shutter sound.

Since the television signal receiver is configured to select a shutter sound among the variety of shutter sounds represented by the sound data stored in the second storage medium and generate the selected shutter sound when a captured image is stored in the first storage medium, it can inform a user about storage of a captured image in the first storage medium without causing video images of a television program to be partly hidden from view, i.e., without hindering a user from viewing the television program. Accordingly, a user can readily know whether or not an image capture has been successfully performed as well as the number of captured images, the interval between image captures, and so on. Further, since the television signal receiver is capable of generating the variety of shutter sounds, it can provide a user with various kinds of information by varying the shutter sound to be generated.

According to a second aspect of the present invention, a mobile phone equipped with a television signal receiver comprises: a tuner that receives television signals; a decoder that extracts video signals from the television signals received by the tuner; a first storage medium that stores a frame of video signals extracted by the decoder as a captured image; a second storage medium that stores sound data representing a variety of shutter sounds to be generated for informing a user that a captured image has been stored in the first storage medium; and a sound generating circuit that, when a captured image is stored in the first storage medium, selects a shutter sound among the variety of shutter sounds represented by the sound data stored in the second storage medium and generates the selected shutter sound.

Since the mobile phone equipped with the television signal receiver is configured to select a shutter sound among the variety of shutter sounds represented by the sound data stored in the second storage medium and generate the selected shutter sound when a captured image is stored in the first storage medium, it can inform a user about storage of a captured image in the first storage medium without causing video images of a television program to be partly hidden from view, i.e., without hindering a user from viewing the television program. Accordingly, a user can readily know whether or not an image capture has been successfully performed as well as the number of captured images, the interval between image captures, and so on. Further, since the mobile phone is capable of generating the variety of shutter sounds, it can provide a user with various kinds of information by varying the shutter sound to be generated.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Figure 1:
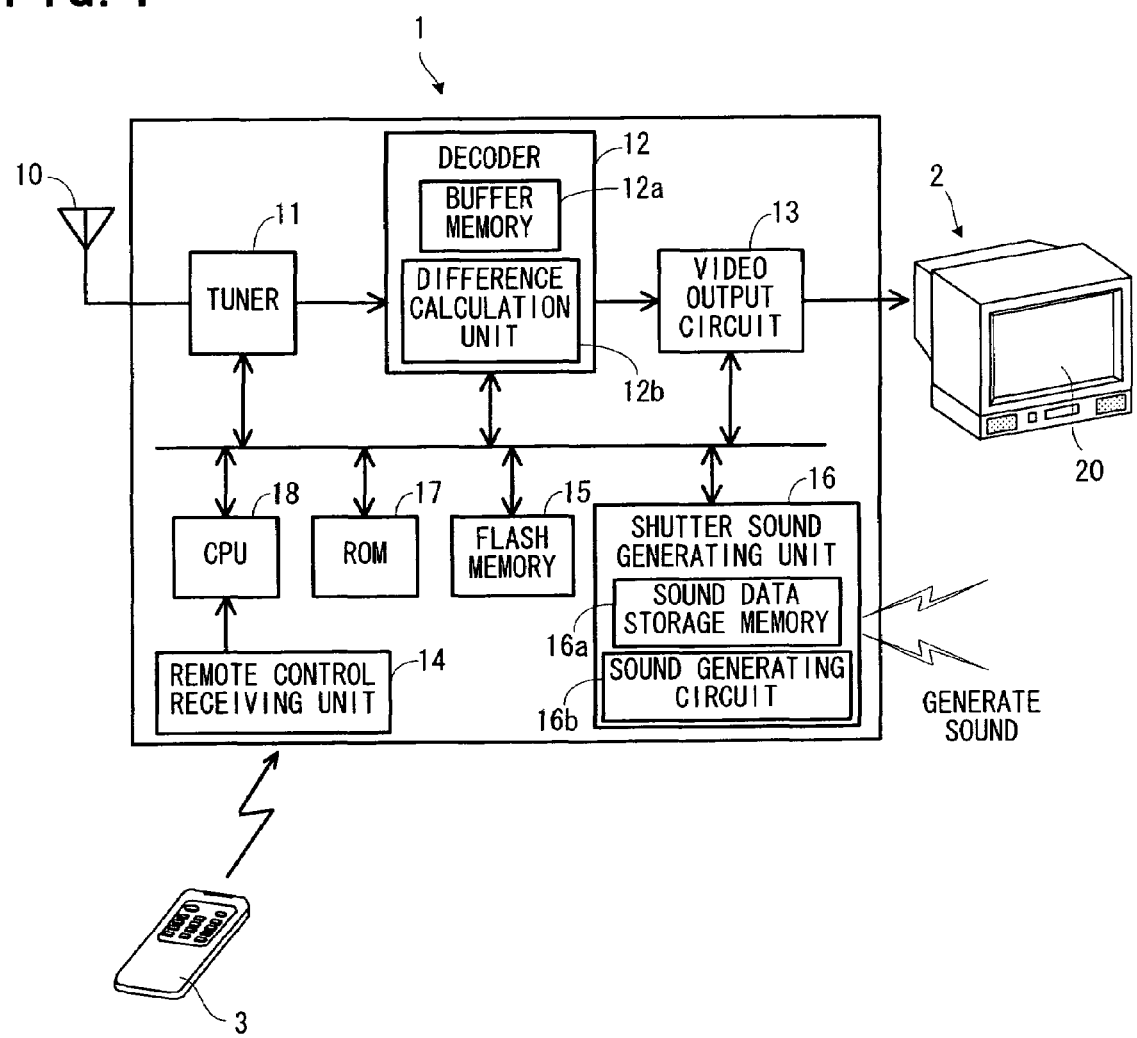
FIG. 1 is a block diagram of a television signal receiver according to a first embodiment of the present invention.
Figure 2:
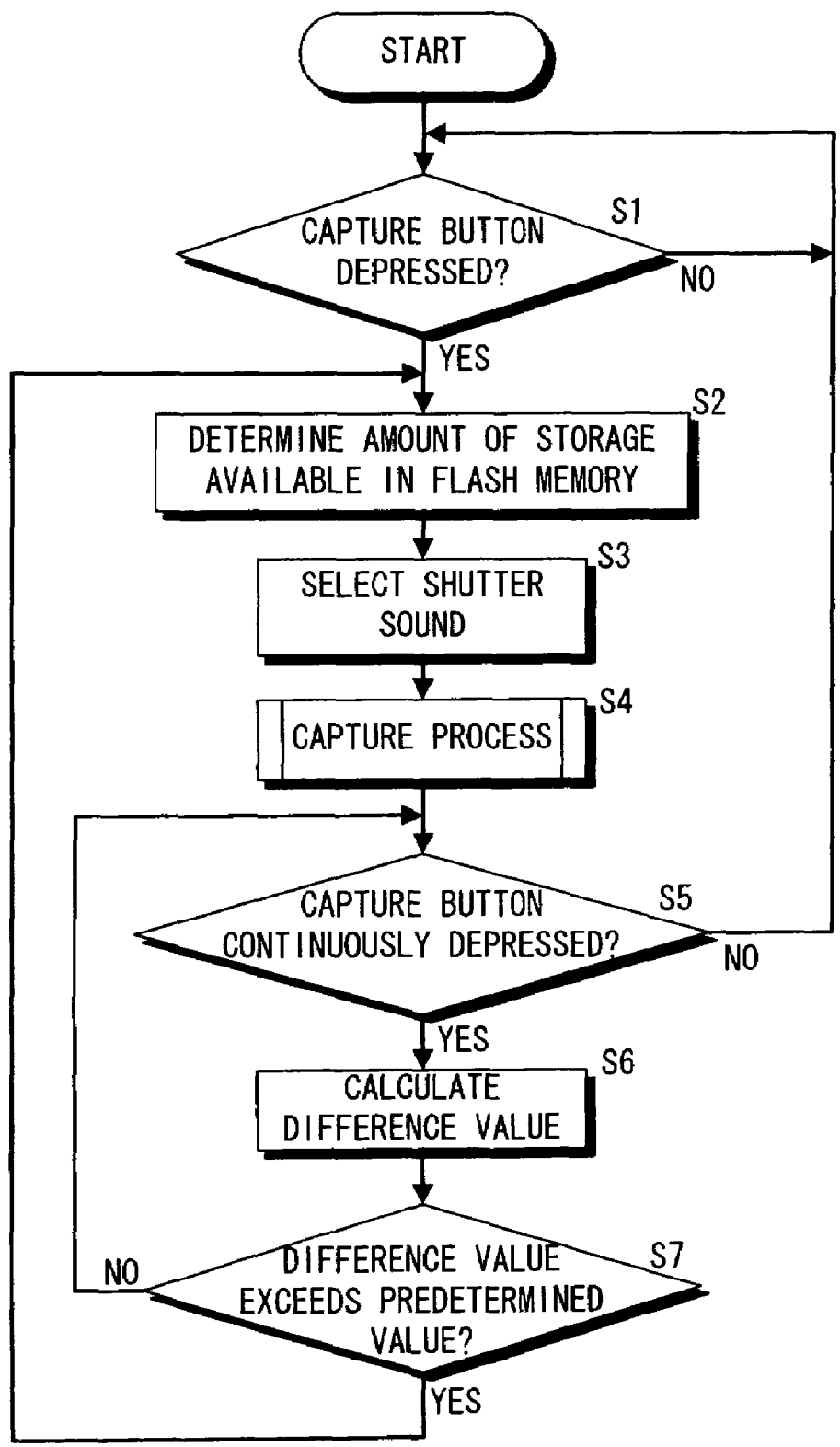
FIG. 2 is a flowchart showing a process executed by the television signal receiver when the television signal receiver is in operation.
Figure 3:
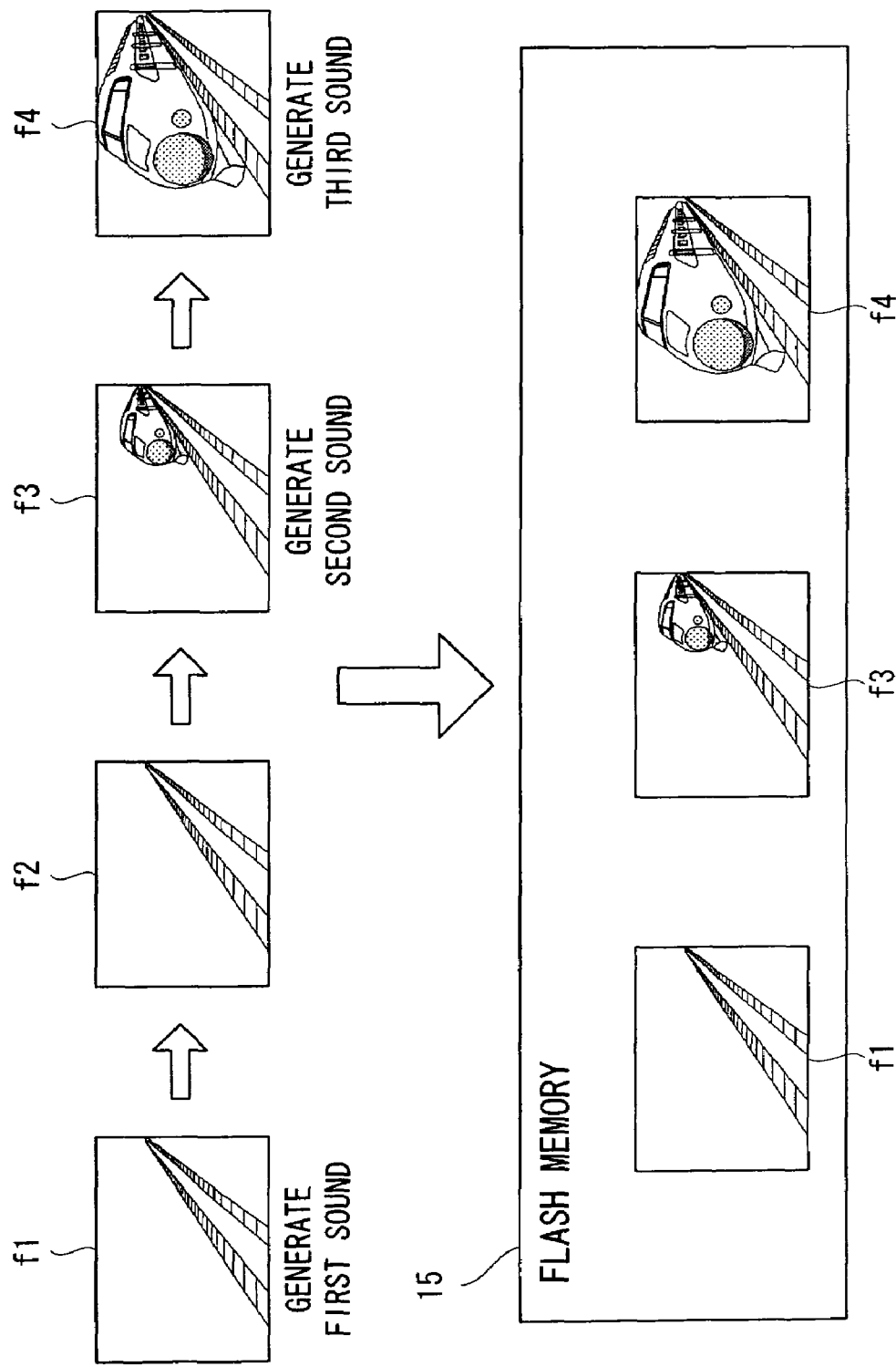
FIG. 3 is a diagram illustrating image captures by the television signal receiver.

Referring now to FIG. 1 to FIG. 3, a first embodiment of the present invention is described. FIG. 1 shows a television signal receiver (hereinafter, abbreviated as a TV signal receiver) 1 according to this embodiment, which is an apparatus that receives, through an antenna 10, digital/analog television signals (hereinafter, referred to simply as TV signals where there is no necessity to distinguish between digital and analog television signals) transmitted from broadcast stations and outputs video signals and audio signals contained in the TV signals to a monitor 2.

The TV signal receiver 1 comprises a tuner 11, a decoder 12, a video output circuit 13, a remote control receiving unit 14, a flash memory 15, a shutter sound generating unit 16, a ROM 17, and a CPU 18.

The TV signal receiver 1 is connected to the antenna 10 for receiving TV signals transmitted at a predetermined radio frequency from a broadcast station, and to the monitor 2 for displaying the video image and generating the sound of a television program.

The tuner 11 is tuned to a frequency corresponding to a channel (physical channel in the case of digital broadcast) selected by a remote controller 3 to receive TV signals on the selected channel through the antenna 10.

When a channel of digital broadcast is selected by the remote controller 3, the decoder 12 demodulates the signals received by the tuner 11 and generates a transport stream (TS) in which digital compression-coded video signals, audio signals, and electric program guide (EPG) data of a plurality of television programs are time-division multiplexed. The decoder 12 extracts, from the TS, the video signals and the audio signals of the television program on the channel selected by the remote controller 3, and decodes the extracted signals into signals before digital compression-coded for output to the monitor 2.

When a channel of analog broadcast is selected by the remote controller 3, the decoder 12 demodulates the signals received by the tuner 11 and extracts the video signals and the audio signals of the television program on the channel selected by the remote controller 3 and outputs the extracted video and audio signals to the monitor 2.

The decoder 12 comprises a buffer memory 12a for temporarily storing a predetermined number of frames of video signals and a difference calculation unit 12b for calculating a difference value between a latest captured image stored in the flash memory 15 and a frame of video signals stored in the buffer memory 12a.

The decoder 12 serves as successive capture means for, when successively storing captured images in the flash memory 15, calculating the difference value between a frame (frame stored as a latest captured image) of video signals stored in the flash memory 15 and a subsequent frame (frame stored in the buffer memory 12a) of video signals by the difference calculation unit 12b, and, if the calculated difference value exceeds a predetermined value, storing the subsequent frame of video signals in the flash memory 15.

The video output circuit 13 is a circuit for outputting video signals extracted by the decoder 12 and a captured image stored in the flash memory 15 to the monitor 2 for display. The video output circuit 13 comprises an on-screen display circuit for superimposing a predetermined display image on input video signals for output to the monitor 2.

The remote control receiving unit 14 receives signals transmitted from the remote controller 3 for output to the CPU 18. The remote controller 3 has a capture button for a user to enter a command for capturing an image, numeric keys, an Enter key, and so on. The remote controller 3 transmits infrared signals corresponding to a key depressed by a user to the remote control receiving unit 14.

The flash memory (first storage medium) 15 stores a frame of video signals extracted by the decoder 12 as a captured image. It is to be noted that a captured image is compressed using e.g. the JPEG standard for storage. A captured image stored in the flash memory 15 remains stored therein even if the power is off.

The shutter sound generating unit 16 comprises a sound data storage memory (second storage medium) 16a for storing sound data representing shutter sounds and a sound generating circuit 16b including an amplifier, a speaker for generating a sound represented by the sound data, and so on. A shutter sound is used for informing a user that a captured image has been stored in the flash memory 15. The sound data stored in the sound data storage memory 16a represents a variety of shutter sounds. It is to be noted that the variety of shutter sounds can be similar but different in e.g. pitch or duration from each other. Alternatively, a variety of messages can be used as shutter sounds. In such a case, sound data representing the variety of messages is stored in the sound data storage memory 16a.

When a captured image is stored in the flash memory 15, the shutter sound generating unit 16 selects a shutter sound among the variety of shutter sounds represented by the sound data stored in the sound data storage memory 16a depending on the amount of storage available in the flash memory 15, and generates the selected shutter sound through the sound generating circuit 16b.

The ROM 17 stores a control program for controlling the entire TV signal receiver 1. The CPU 18 performs various processing based on the control program to control the respective components of the TV signal receiver 1.

Referring now to the flowchart of FIG. 2, a description is made as to the process from depression of the capture button by a user to storage of a captured image. The TV signal receiver 1 checks at all times during operation whether or not the capture button is depressed (S1). When the capture button is depressed (YES at S1), the TV signal receiver 1 determines the amount of storage available in the flash memory 15 (S2). Data about the determined amount of storage available in the flash memory 15 is input to the shutter sound generating unit 16, which selects a shutter sound depending on the amount of storage available in the flash memory 15 (S3). Then, at a capture process of the step S4, a frame of video signals extracted by the decoder 12 are stored as a captured image in the flash memory 15 while the shutter sound selected at the step S3 comes out of the shutter sound generating unit 16.

Next, it is determined whether or not the capture button has been depressed continuously for more than a predetermined time period (S5). If the capture button has not been depressed continuously (NO at S5), the process returns to the step S1, and thus the process from the step S1 is repeated. On the other hand, if the capture button has been depressed continuously (YES at S5), a difference value is calculated between the video signals stored as the latest captured image in the flash memory 15 at the step S4 and a frame of video signals stored in the buffer memory 12*a* (S6). Then, a determination is made as to whether or not the difference value exceeds a predetermined value (S7). If the difference value does not exceed a predetermined value (NO at S7), the process returns to the step S5, and thus the process from the step S5 is repeated. Otherwise, if the difference value exceeds a predetermined value (YES at S7), the process from the step S2 is repeated so that the additional captured image is stored in the flash memory 15.

An example is now described where shutter sounds to be generated vary in duration depending on the amount of storage available in the flash memory 15. Referring to FIG. 3, when a user depresses the capture button at the time when a frame f1 is displayed on a monitor screen 20 of the monitor 2 (YES at S1), a shutter sound is selected depending on the amount of storage available in the flash memory 15 (S2 and S3). As a result, the frame f1 is stored as a captured image in the flash memory 15 while the selected shutter sound, a first sound like a sound that often comes out when a camera's shutter releases, is generated. If the capture button is continuously depressed after that (YES at S5), a difference value is calculated between the video signals of the frame f1 and the video signals of a frame f2 that is subsequent to the frame f1 (S6). As shown in FIG. 3, there is little change between the images of the frames f1 and f2. Thus, the calculated difference value does not exceed the predetermined value (NO at S7), so that the process returns to the step S5 for repeat. If the capture button is further continuously depressed (YES at S5), a difference value is calculated between the video signals of the frame f1 and the video signals of a frame f3 that is subsequent to the frames f1 and f2 (S6). Since there is considerable change between the images of the frames f1 and f3, the difference value exceeds the predetermined value (YES at S7). Thus, the process returns to the step S2, so that a shutter sound is selected depending on the amount of storage available in the flash memory 15 (S2 and S3). Then, at the step S4, the frame f3 is stored as a captured image in the flash memory 15 while the selected shutter sound, a second sound longer in duration than the first sound, is generated. The process as described above is then repeated, so that a frame f4 is stored as a captured image in the flash memory 15 while a third sound longer in duration than the first and second sounds, is selected depending on the amount of storage available in the flash memory 15 to be generated. In this manner, the less the amount of storage available in the flash memory 15, the longer duration of shutter sound is generated, whereby the amount of storage available in the flash memory 15 is informed to a user.

As described above, the TV signal receiver 1 of this embodiment is configured to select a shutter sound among the variety of shutter sounds represented by the sound data stored in the sound data storage memory 16*a* and generate the selected shutter sound when a captured image is stored in the flash memory 15. Accordingly, storage of a captured image in the flash memory 15 can be informed to a user without causing the video images of a television program to be partly hidden from view, i.e., without hindering a user from viewing the television program.

Since a shutter sound is selected depending on the amount of storage available in the flash memory 15 to be generated, information about the amount of storage available in the flash memory 15 can be provided to a user only by the sound generation. Besides, as described above, when successively storing captured images in the flash memory 15, a difference value is calculated between a first frame of video signals stored in the flash memory 15 and a subsequent frame of video signals, so that the subsequent frame of video signals are stored in the flash memory 15 only when the calculated difference value exceeds the predetermined value. This can result in effective use of storage in the flash memory 15. Further, when successively storing captured images in the flash memory 15, a user can keep track of the amount of storage available in the flash memory 15 for the successive storage of captured images since shutter sounds varying depending on the amount of storage available in the flash memory 15 are generated.

Figure 4:
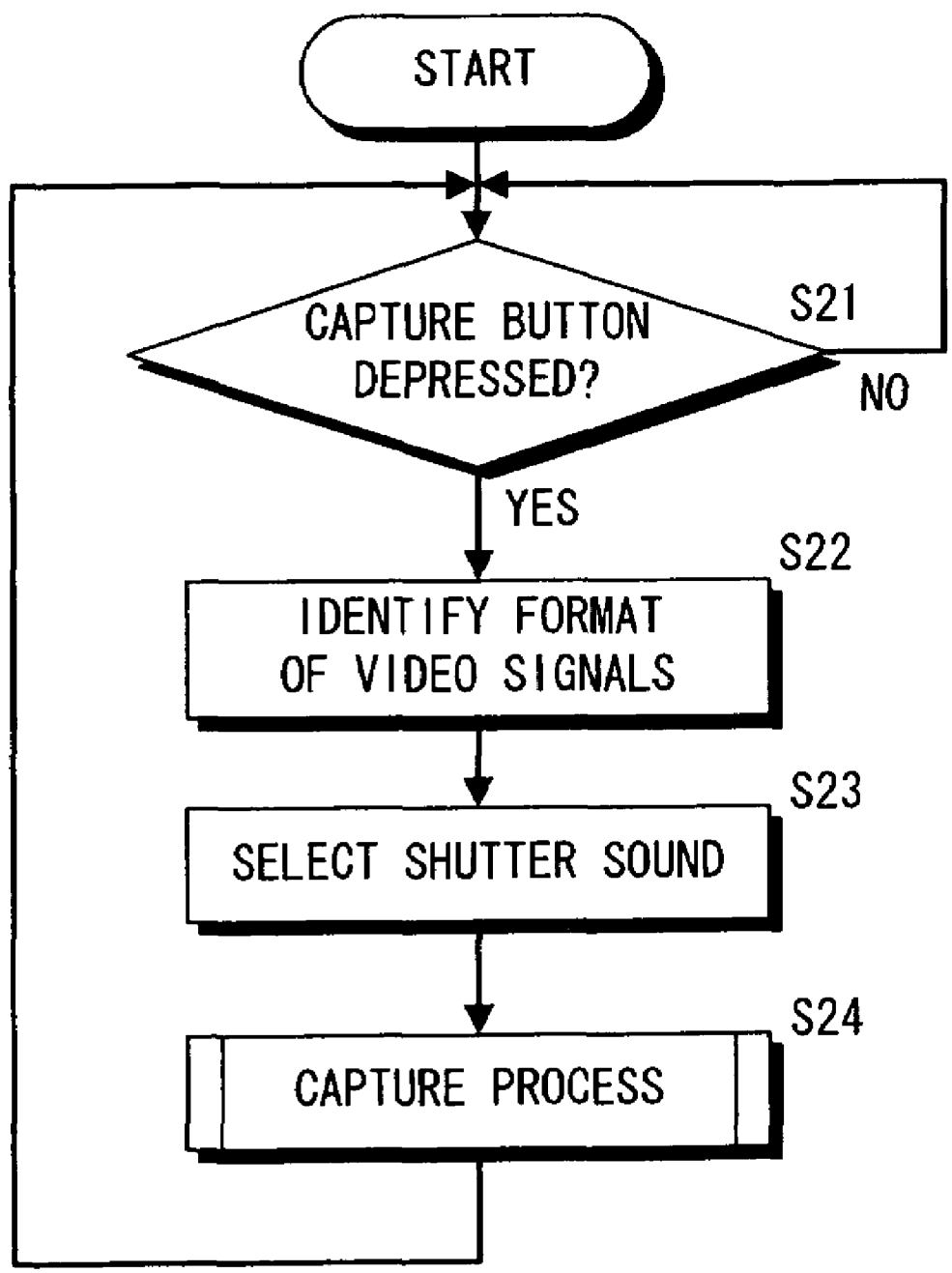
FIG. 4 is a flowchart showing a process executed by a television signal receiver according to a second embodiment of the present invention when the television signal receiver is in operation.

Referring now to FIG. 4, a second embodiment of the present invention is described. A TV signal receiver 1 in this embodiment is different from the first embodiment in that a shutter sound is selected depending on the format of video signals stored as a captured image, e.g., on the video format such as 1080i, 1080p, 480i, 480p, or 720p, the aspect ratio such as 16:9 or 4:3, or the frame rate such as 30 f/sec or 24 f/sec. The frame rate of 30 f/sec is used in general television broadcast while the frame rate of 24 f/sec is used in movies and the like.

The TV signal receiver 1 checks at all times during operation whether or not the capture button is depressed (S21). When the capture button is depressed (YES at S21), the TV signal receiver 1 identifies the format of video signals to be captured (S22). Data about the identified format of the video signals is input to the shutter sound generating unit 16, which selects a shutter sound depending on the format of the video signals (S23). Then, at a capture process of the step S24, a frame of video signals extracted by the decoder 12 are stored as a captured image in the flash memory 15 while the shutter sound selected at the step S23 comes out of the shutter sound generating unit 16.

According to the TV signal receiver 1 in this embodiment, since a shutter sound selected depending on the format of video signals stored as a captured image is generated, the format of video signals can be informed to a user only by the sound generation.

Figure 5:
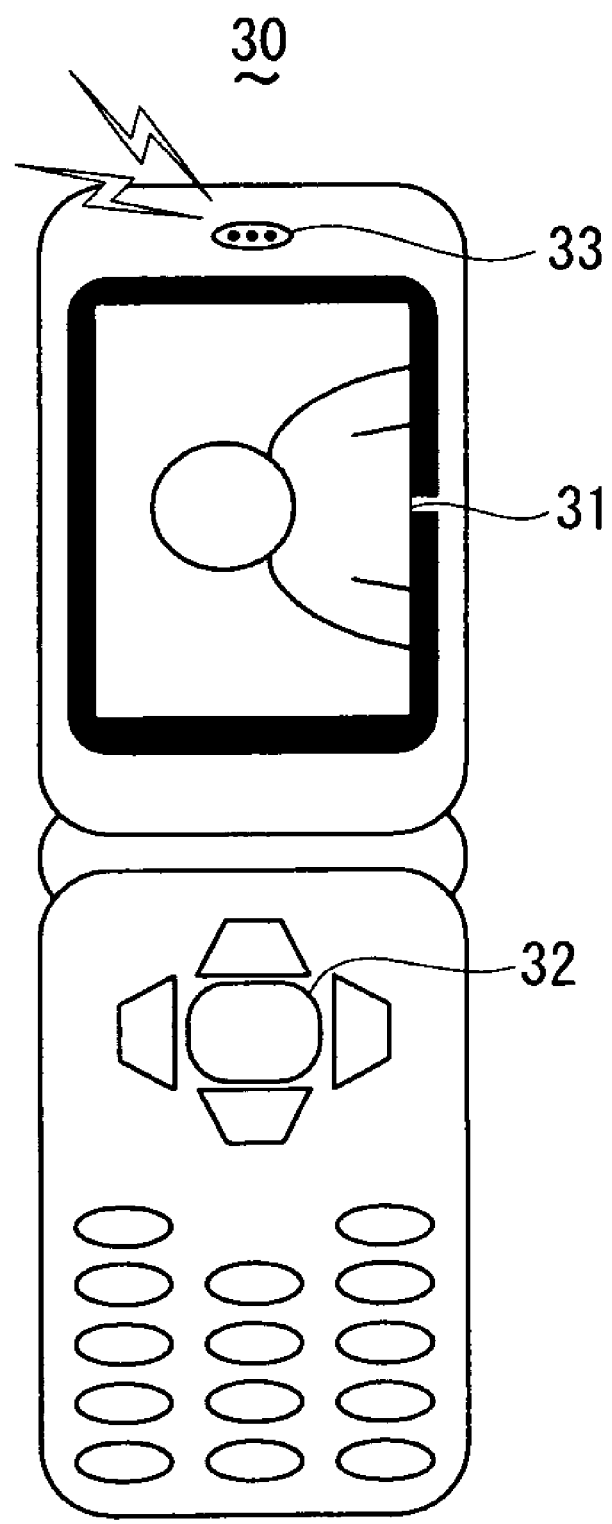
FIG. 5 is a front view of a mobile phone according to a third embodiment of the present invention.

Referring now to FIG. 1 and FIG. 5, a third embodiment of the present invention is described. A mobile phone 30 according to this embodiment comprises a TV signal receiver 1 according to the above-described first or second embodiment (See FIG. 1). It is to be noted that the mobile phone 30 is configured in a manner similar to a typical mobile phone except that it is equipped with the TV signal receiver 1.

When the TV signal receiver 1 is in operation, the mobile phone 30 outputs video signals that are received by a tuner 11 and extracted by a decoder 12 to a monitor screen 31 and checks at all times whether or not a capture button 32 is depressed. When the capture button 32 is depressed, the mobile phone 30 stores a frame of video signals extracted by the decoder 12 as a captured image in a flash memory 15 while selecting a shutter sound among a variety of shutter sounds represented by sound data stored in a sound data storage memory 16*a* to generate the selected shutter sound through a speaker 33.

As described above, the mobile phone 30 of this embodiment is configured to select a shutter sound among the variety of shutter sounds represented by the sound data stored in the sound data storage memory 16*a* and generate the selected shutter sound when a captured image is stored in the flash memory 15. Thereby, storage of a captured image in the flash memory 15 can be informed to a user without causing video images of a television program to be partly hidden from view, i.e., without hindering a user from viewing the television program. Accordingly, a user can readily know whether or not an image capture has been successfully performed as well as the number of captured images, the interval between image captures, and so on. Further, since the mobile phone 30 is capable of generating the variety of shutter sounds, it can provide a user with various kinds of information by varying the shutter sound to be generated.

The present invention has been described above using presently preferred embodiments, but those skilled in the art will appreciate that various modifications are possible. Accordingly, all such modifications are intended to be included within the spirit and scope of the present invention. For example, additional information provided to a user in capturing an image is not limited to the amount of storage available in the flash memory 15 and the format of video signals. In the case where video signals input from an external device are captured for example, information about the external device can be provided to a user by generating a shutter sound.

This application is based on Japanese patent application 2004-201696 filed Jul. 8, 2004, the contents of which are hereby incorporated by reference.

What is claimed is:

1. A television signal receiver comprising:
a tuner that receives television signals;
a decoder that extracts video signals from the television signals received by the tuner;
a first storage medium that stores a frame of video signals extracted by the decoder as a captured image;
a second storage medium that stores sound data representing a variety of shutter sounds to be generated for informing a user that a captured image has been stored in the first storage medium;
a sound generating circuit that, when a captured image is stored in the first storage medium, selects a shutter sound among the variety of shutter sounds represented by the sound data stored in the second storage medium and generates the selected shutter sound, the selected shutter sound depending on an amount of storage available in the first storage medium; and
successive capture means for, when successively storing captured images in the first storage medium, calculating a difference value between a frame of video signals stored in the first storage medium and a subsequent frame of video signals, and storing the subsequent frame of video signals in the first storage medium if the calculated difference value exceeds a predetermined value.

2. A television signal receiver comprising:
a tuner that receives television signals;
a decoder that extracts video signals from the television signals received by the tuner;
a first storage medium that stores a frame of video signals extracted by the decoder as a captured image;
a second storage medium that stores sound data representing a variety of shutter sounds to be generated for informing a user that a captured image has been stored in the first storage medium;
a sound generating circuit that, when a captured image is stored in the first storage medium, selects a shutter sound among the variety of shutter sounds represented by the sound data stored in the second storage medium and generates the selected shutter sound, wherein the sound generating circuit selects a shutter sound depending on a format of video signals stored as a captured image.

3. The television signal receiver according to claim 2, further comprising successive capture means for, when successively storing captured images in the first storage medium, calculating a difference value between a frame of video signals stored in the first storage medium and a subsequent frame of video signals, and storing the subsequent frame of video signals in the first storage medium if the calculated difference value exceeds a predetermined value.

4. A television signal receiver comprising:
a tuner that receives television signals;
a decoder that extracts video signals from the television signals received by the tuner;
a first storage medium that stores a frame of video signals extracted by the decoder as a captured image;
a second storage medium that stores sound data representing a variety of shutter sounds to be generated for informing a user that a captured image has been stored in the first storage medium;
a sound generating circuit that, when a captured image is stored in the first storage medium, selects a shutter sound among the variety of shutter sounds represented by the sound data stored in the second storage medium and generates the selected shutter sound; and
successive capture means for, when successively storing captured images in the first storage medium, calculating a difference value between a frame of video signals stored in the first storage medium and a subsequent frame of video signals, and storing the subsequent fame of video signals in the first storage medium if the calculated difference value exceeds a predetermined value.

5. A mobile phone equipped with a television signal receiver, comprising:
a tuner that receives television signals;
a decoder that extracts video signals from the television signals received by the tuner;
a first storage medium that stores a frame of video signals extracted by the decoder as a captured image;
a second storage medium that stores sound data representing a variety of shutter sounds to be generated for informing a user that a captured image has been stored in the first storage medium;
a sound generating circuit that, when a captured image is stored in the first storage medium, selects a shutter sound among the variety of shutter sounds represented by the sound data stored in the second storage medium and generates the selected shutter sound, the selected shutter sound depending on an amount of storage available in the first storage medium; and
successive capture means for, when successively storing captured images in the first storage medium, calculating a difference value between a frame of video signals stored in the first storage medium and a subsequent frame of video signals, and storing the subsequent frame of video signals in the first storage medium if the calculated difference value exceeds a predetermined value.

6. A mobile phone equipped with a television signal receiver, comprising:
a tuner that receives television signals;
a decoder that extracts video signals from the television signals received by the tuner;
a first storage medium that stores a frame of video signals extracted by the decoder as a captured image;
a second storage medium that stores sound data representing a variety of shutter sounds to be generated for informing a user that a captured image has been stored in the first storage medium;
a sound generating circuit that, when a captured image is stored in the first storage medium, selects a shutter sound among the variety of shutter sounds represented by the sound data stored in the second storage medium and generates the selected shutter sound, wherein the sound generating circuit selects a shutter sound depending on a format of video signals stored as a captured image.

7. The mobile phone according to claim 6, further comprising successive capture means for, when successively storing captured images in the first storage medium, calculating a difference value between a frame of video signals stored in the first storage medium and a subsequent frame of video signals, and storing the subsequent frame of video signals in the first storage medium if the calculated difference value exceeds a predetermined value.

8. A mobile phone equipped with a television signal receiver, comprising:
- a tuner that receives television signals;
- a decoder that extracts video signals from the television signals received by the tuner;
- a first storage medium that stores a frame of video signals extracted by the decoder as a captured image;
- a second storage medium that stores sound data representing a variety of shutter sounds to be generated for informing a user that a captured image has been stored in the first storage medium;
- a sound generating circuit that, when a captured image is stored in the first storage medium, selects a shutter sound among the variety of shutter sounds represented by the sound data stored in the second storage medium and generates the selected shutter sound; and
- successive capture means for, when successively storing captured images in the first storage medium, calculating a difference value between a frame of video signals stored in the first storage medium and a subsequent frame of video signals, and storing the subsequent frame of video signals in the first storage medium if the calculated difference value exceeds a predetermined value.

* * * * *